(No Model.) 2 Sheets—Sheet 1.

A. B. SMITH.
ANIMAL TRAP.

No. 273,321. Patented Mar. 6, 1883.

Witnesses: Inventor:
A. B. Smith.
By James L. Norris
Atty (No Model.) 2 Sheets—Sheet 2.

A. B. SMITH.
ANIMAL TRAP.

No. 273,321. Patented Mar. 6, 1883.

Witnesses:
C. S. Hyer
J. A. Rutherford

Inventor:
A. B. Smith.
By James L. Norris
Atty

UNITED STATES PATENT OFFICE.

ABRAHAM B. SMITH, OF PETERSBURG, PA., ASSIGNOR TO MANNING R. SHANKLAND AND CHARLES WALTER, BOTH OF WASHINGTON, D. C.

ANIMAL-TRAP.

SPECIFICATION forming part of Letters Patent No. 273,321, dated March 6, 1883.

Application filed December 1, 1882. (No model.)

*To all whom it may concern:*

Be it known that I, ABRAHAM B. SMITH, a citizen of the United States, residing at Petersburg, Adams county, Pennsylvania, have invented new and useful Improvements in Animal Traps, of which the following is a specification.

This invention relates to that class of cage-traps in which the doors are closed by reason of the weight of the animal upon a platform arranged within a compartment of the cage and connected with the doors, and another compartment having an inwardly-opening trap-door provided for the final reception of the animal after it has thus closed the doors behind it.

In carrying out my invention I provide the box or cage with three longitudinal compartments, extending from end to end of the structure. The first compartment is provided with two swinging doors—one at each end—and at or about its center provided with a tilting platform, arranged substantially on a level with the floor, and connected by a link with a horizontal latch-lever employed for holding the doors open, so as to set the trap, while the tilting of the said platform effects the release of the doors, so as to allow them to close. A second compartment communicates with the first compartment through an opening in the partition between the two, and this second compartment is provided with a rocking or tilting platform, pivoted at its middle and extending the entire length of the compartment, so as to form a false bottom or floor for the same. The pivots for the two doors extend through the partition into the second compartment, and are each provided with an arm, one of which arms is set upon one of the pivots, so that when the doors are closed it shall rest upon one end of the tilting platform, so that when said end is raised the arm will be swung up and the doors simultaneously opened by reason of a connection between the arms on their pivot. The second compartment opens into a third compartment, destined for the final reception of the animal. The passage between the two is closed by a swinging trap-door or gate, and is located in the partition between the two compartments, alongside of that end of the second compartment opposite to the end in which the arm is acted on by the tilting platform.

Figure 1:
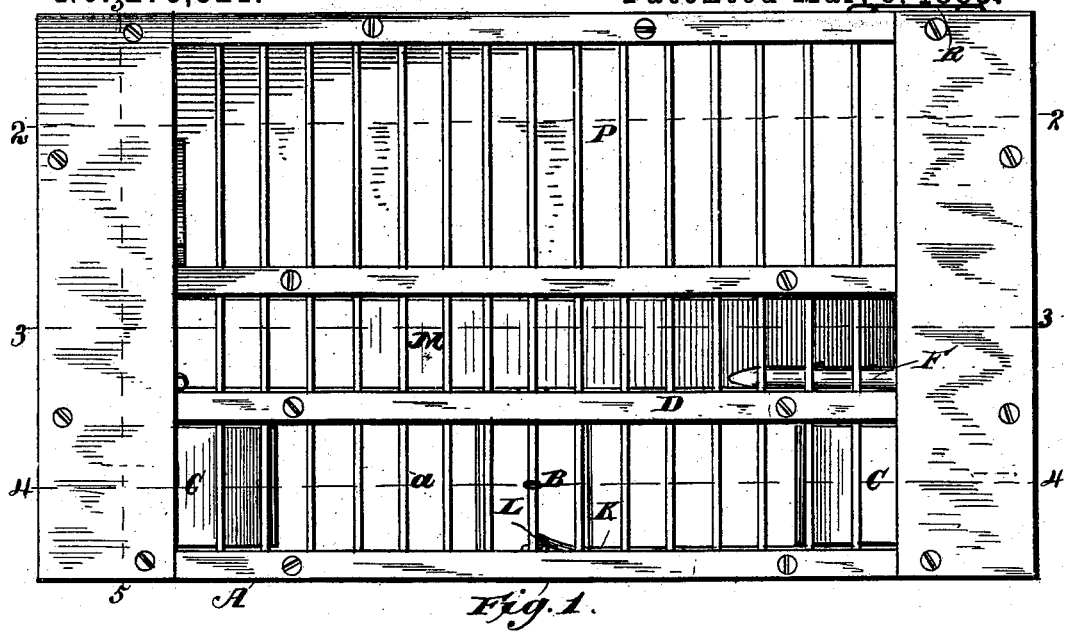
Figure 2:
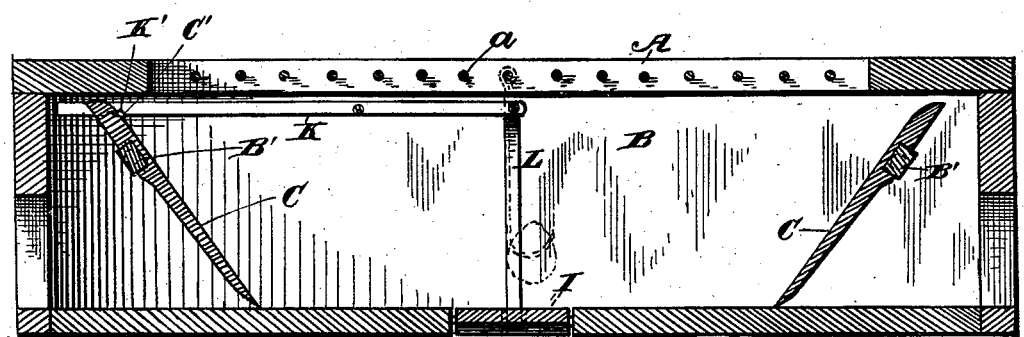
Figure 3:
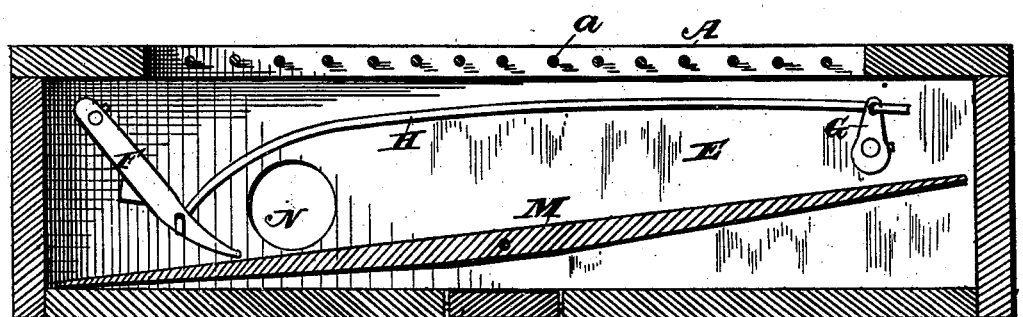
Figure 4:
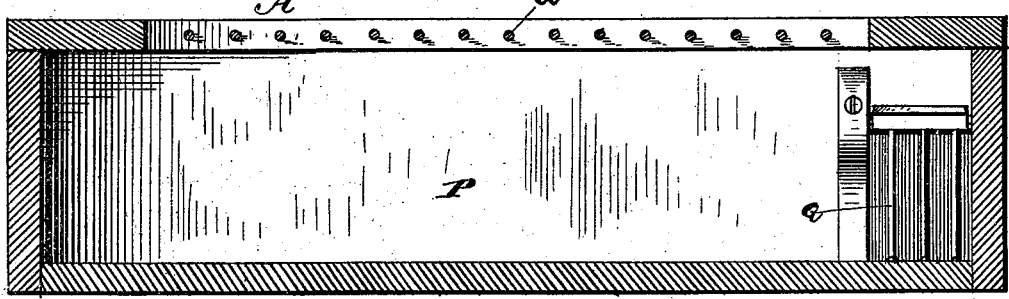
Figure 5:
Figure 6:
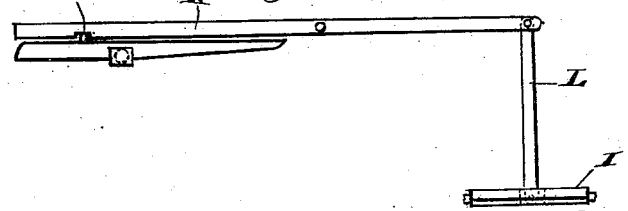

In the annexed drawings, Figure 1 is a top or plan view of my improved cage-trap. Fig. 2 is a longitudinal vertical section taken on the line 4 4. Fig. 3 is a longitudinal vertical section on line 3 3. Fig. 4 is a like section on the line 2 2. Fig. 5 is a transverse section on line 5 5; Fig. 6, a detached view of one of the trap-doors, the horizontal latch-lever, and its link, connected with the tilting platform of the first compartment.

The cage A consists of a rectangular box provided with an open top, having wires $a$ arranged across the same, so as to prevent the escape of the animal and at the same time admit light into the trap. This box or cage is divided into three parallel compartments, the first of which, B, is provided with swinging doors C for closing the openings at its ends.

The rock-shafts or pivots B' of these doors extend through the partition D into the second compartment, E, in which said pivots are respectively provided with arms F and G, connected together by a rod, H, so that the movement of one arm will move the other, whereby both doors will swing, so as to open or close simultaneously.

The tilting platform I, arranged in an opening in the floor of compartment B, is connected with the inner end of an upper lever, K, by means of a link, L. This lever is pivoted to one of the walls of compartment B, and has in its outer end a notch, K', adapted to engage a catch, C', or other suitable projection fixed on one of the doors C at a point above the pivot of the door, whereby when the doors are raised horizontally the said catch will engage in the notch of the latching-lever, which will thereby hold the doors open.

The rocking platform M, pivoted at its center in the second compartment, E, is arranged so that when its end next to the passage N between the first two compartments is tilted down the animal can pass onto the platform through the said passage, and when said end is tilted up the animal can pass through the passage O into the third compartment, P, by reason of the opposite end of the platform being tilted down below the said passage, this last-mentioned tilting of the platform being of course effected by the animal traveling along the platform toward the end thereof which is opposite the said passage O.

The arm G on one of the door-pivots is simply a short crank-arm, while the arm F is made considerably longer, so that when the doors are closed the outer or lower end of said arm will bear upon the tilting platform in compartment E.

The passage G is closed by a hinged wire-door, Q, which opens inwardly in compartment P, and said compartment is provided with a door, R, which can be opened when it is desired to free the trap of the animals caught therein. When the trap is set the doors will be raised horizontally and held open by the latch-lever. The animals enter either door of the first compartment, B, and in passing over the tilting platform in said compartment, so as to reach a bait suspended above the same, will depress said platform, and hence operate the latch-lever so as to release the doors and allow them to close. As the doors swing down arm F will strike one end of the tilting platform in compartment E, so as to depress said end below the passage between compartments B and E, and thereby allow the rat or mouse to enter the latter. As the animal runs along said second compartment it will bear down the opposite end of the tilting platform therein, so that said end will come below the passage between the compartment E and the third and final compartment, P. The animal will then naturally push against the wire door between such compartments, and, raising the door, enter the compartment P, in which it will be finally entrapped, since the door will automatically close by gravity. When the animal tilts down the platform in compartment E in passing to the door between said compartments and the one destined for its final reception the end of the tilting platform under arm F will raise said arm, and hence cause the pivots of the doors to turn, whereby the doors will be again swung up and opened. When the doors are fully open the catch on one of them will come in position to again engage the latch-lever, and hence the trap will be reset.

What I claim is—

1. The combination of the cage divided into three communicating compartments, joined together by a single connecting-rod, so as to simultaneously open and close, and a tilting platform connected by a link with one end of a pivoted latch-lever, which engages one of the doors when they are open, the said platform, by its tilting movement, effecting the release of the doors and permitting them to close, substantially as described.

2. The combination of the cage divided into three communicating compartments, the doors for the first compartment connected to simultaneously open and close, a tilting platform in the first compartment, connected by a link with a latch-lever engaging one of the doors when they are open, which platform, by its tilting movement, effects the release of the doors to permit them to close, and a tilting-platform in the second compartment, which, in its tilting movements acts upon an arm connected with one of the doors, and thereby resets the trap, substantially as described.

3. An animal-trap consisting of the cage A, divided into three communicating longitudinal compartments extending from end to end thereof, with the doors at the ends of the first compartment, the tilting platform I, connected by a link with a horizontal pivoted lever, K, having a notch at its outer end for engaging with one of the doors, the rocking platform M, pivoted in the second compartment, the long arm F and the short arm G, respectively secured upon the pivots, which are rigid with the doors, and the rod connecting said arms, the said parts being arranged so that the tilting of the platform I effects the release of the doors to permit them to close, while the tilting of the platform M resets the trap; substantially as described.

In testimony whereof I have hereunto set my hand in the presence of two subscribing witnesses.

ABRAHAM B. SMITH.

Witnesses:
CHAS. A. WALTER,
L. G. HINE.